United States Patent Office 3,694,179
Patented Sept. 26, 1972

3,694,179
METHOD FOR PRODUCING PHOSPHATE OPTICAL GLASSES
Emil W. Deeg and Robert W. Young, Woodstock, Conn., assignors to American Optical Corporation, Southbridge, Mass.
No Drawing. Filed Mar. 3, 1971, Ser. No. 120,779
Int. Cl. C03b 5/08
U.S. Cl. 65—136                                   5 Claims

ABSTRACT OF THE DISCLOSURE

Phosphate glasses for optical applications are produced by an improved method in which the ceramic utensils utilized in the production of the glass are formed of tin oxide.

BACKGROUND OF THE INVENTION

This invention is related to methods for the production of glasses and is more particularly concerned with an improved method for producing phosphate glasses.

Phosphate glasses are those glasses which have phosphorous pentoxide ($P_2O_5$) as the essential glass forming oxide. These glasses, as a class, have many desirable optical properties. For instance, phosphate optical glasses are the basis for a multitude of optical glasses having anomalous relative partial dispersion values. Furthermore, phosphate glasses are utilized for heat screening (absorbing) and protective filter glasses for lasers operating in the infrared spectral region. These properties are achieved by incorporating ferrous ions within a phosphate base glass. In addition, the potential uses of phosphate optical glasses are being expanded rapidly in areas such as fluorine chemistry and spectrochemistry.

Phosphate optical glasses, as most other classes of optical glass, are generally prepared, at present, in high purity ceramic crucibles. In some special instances, platinum or platinum lined crucibles are used. While these procedures have been found to be entirely sufficient for the production of most classes of high purity optical glass, these procedures have not been satisfactory for producing large quantities of high purity phosphate base optical glasses. The phosphate glass melts attack the standard ceramic refractory materials such as are generally used to form the crucibles, stirrers, and furnace tanks in the glass making art. This attacking of the refractory materials causes a two-fold problem, the phosphate glass is contaminated and the durability of the ceramic utensils is greatly diminished. Alumina based ceramics are the most common refractory materials presently used in the phosphate glass making art. Therefore, it is extremely difficult to prepare such glasses which are stria-free utilizing such ceramic utensils as high purity glass may only be produced by neglecting to stir the melt so that the contaminated glass is near the sides of the crucible and extracting the glass from the center of the melt.

As was mentioned heretofore, platinum crucibles, stirrers, and platinum-lined tank furnaces have been used, on occasion, for providing an environment in which high purity phosphate glasses may be produced. However, economically, it would be advisable to utilize ceramic materials which may withstand the attack of phosphate glass melts. Further, the platinum-lined utensils are attacked also if the phosphate optical glass melts are produced under reducing conditions. The reducing conditions are currently present in phosphate glass melts such as for the aforementioned heat-screen glasses and infrared laser eye protective filter glasses.

SUMMARY OF THE INVENTION

Accordingly, it is an object of the present invention to provide an improved method for producing phosphate glasses.

Another object of the invention is to provide such a method which may be directly incorporated into standard glass melting furnaces.

It is a further object of the invention to provide such a method for producing phosphate optical glasses efficiently and economically.

Briefly, the invention in its broadest aspect is a method for producing phosphate glasses. According to the method, ceramic utensils are formed of tin oxide where the tin oxide is of a purity of at least 95 percent. The phosphate-glass-forming batch constituents are placed in the tin oxide ceramic utensils and the batch constituents are melted within the tin oxide ceramic utensils. Thereafter, the phosphate glass is recovered.

Further objects, advantages, and features of the invention will be apparent from the following detailed specification.

DETAILED DESCRIPTION OF THE PREFERRED EMBODIMENTS

The following detailed description is directed generally to optical phosphate glass, the presently preferred mode of utilization; however, it is to be understood that high quality phosphate glasses for all applications are included within the purview of the invention.

It has been found that when the ceramic utensils are formed of tin oxide ceramics that the phosphate optical glasses thus produced are of exceptionally high quality and may be produced under either oxidizing, neutral, or reducing conditions. The reasons for the exceptional quality achieved by utilizing the tin oxide utensils is the high resistance against attack by phosphate melts whose origin is presently unknown. However, as will be seen in the detailed examples set forth hereinbelow, both oxidizing and highly reducing glass melts have been produced using tin oxide utensils with no significant degradation of the utensils as a result of those glass melting conditions.

As was previously mentioned, high purity phosphate glasses could be formed with the ceramic utensils of the prior art. However, this could be done only by melting the batch constituents without the benefit of stirring and then extracting the resulting glass only from the center portions of the crucible. Even this procedure introduced many striae in the glass. These striae are eliminated within the method of the present invention as a stirrer of tin oxide may be utilized for stirring and homogenizing the glass melt. This method represents a significant improvement in the optical glass making art because high quality optical glasses cannot tolerate the presence of striae.

The desired tin oxide crucibles may be prepared according to standard ceramic methods such as slip casting, hot pressing or dry pressing with subsequent sintering in each instance. It is preferable that the purity of the tin oxide ceramic utensils be at least 99 percent; however, it is possible that tin oxide ceramic utensils having a purity as low as 95 percent may be utilized according to the invention and still produce high purity phosphate optical glasses provided that the desired phosphate optical glass may include therein small amounts of any impurities present in the tin oxide ceramic utensils. For example, if a phosphate base optical glass is desired having divalent iron ions therein for laser eye protection, it would be able to withstand minor amounts of ferrous oxide as an impurity within the tin oxide utensils as any ferrous oxide dissolved from the crucible into the melt would be complementary to the ferrous oxide present within the melt initially.

The specific phosphate-glass-forming batch constituents, which vary widely depending upon the particular glass desired, are placed in the tin oxide ceramic utensils. The precise process for filling the tin oxide utensils, the schedule for melting of the batch constitutents and the subsequent recovery of the phosphate glass depends upon the particular phosphate glass to be produced. Two specific examples are given herebelow.

EXAMPLE I

A glass batch having the following batch composition was formed: 450 grams $Al(PO_3)_2$, 30 grams $ZnCO_3$, and 15.6 grams $Al(OH)_3$. These constituents were carefully mixed and filled in portions of approximately 150 grams each into a tin oxide crucible of a purity exceeding 95 percent at a temperature of 2700° F. The filling of the crucible was completed after approximately 1 hour. Approximately 1.5 hours after the initial fill, the temperature of the furnace was reduced to approximately 2500° F. and for a subsequent period of 24 hours the glass melt was mechanically stirred. A tin oxide bar, again having a purity exceeding 95 percent, was used as a stirrer. The tin oxide bar had a square cross-section of approximately 8 x 8 millimeters. The stirring rod was removed after the stirrin gprocess was completed and the furnace temperature subsequently reduced to 2400° F., at which temperature the resulting glass was cast in the form of a flat sheet approximately 1 centimeter in thickness, 5 centimeters in width, and 12 centimeters long. This cast glass sheet was annealed at a temperature of approximately 1100° F. for a period of 16 hours. At the conclusion of this procedure, the crucible as well as the stirrer showed no significant corrosion.

EXAMPLE II

A glass batch was formed which consisted of the following batch constituents: 105.3 grams $NH_4H_2PO_4$, 30 grams $La_2O_3$, 2 grams ZnO, 1.53 grams $Al(OH)_3$, and 2 grams of metallic iron powder. These batch constituents were mixed thoroughly and filled in portions of approximately 50 grams each into a preheated tin oxide crucible at a temperature of approximately 2400° F. Again, the tin oxide utensils were of a purity exceeding 95 percent. This filling process was completed after approximately 30 minutes. The glass melt was stirred with a tin oxide stirring rod at the temperature of 2400° F. for a period of one hour. The temperature was then increased to 2600° F. under continuous stirring at 2600° F., the temperature was further increased to 2700° F. After a total melting time of about 5 hours, counted from the time of first filling, the melt was cast at 2700° F. into a rectangular plate of approximately 8 millimeters thickness, 20 millimeters width, and 30 millimeters length. The glass was annealed by a process which started at 1100° F. and the annealing temperature was reduced in 50° F. increments each half hour. Once again, there was no evident attack on either the tin oxide crucible or the tin oxide stirrer.

This glass is an excellent laser eye protective glass for infrared emitting lasers due to the high infrared absorption. It has a refractive index ($N_d$) of 1.6688 and an Abbe number ($\nu_d$) of 40.8.

Although many widely varying phosphate glass compositions may be formed according to the process of the invention, it has been chosen to set forth an instance where a phosphate optical glass is produced in which the melt conditions are essentially neutral. In Example II, the phosphate glass melted therein was done under strongly reducing conditions which were produced by the presence of the metallic iron within the batch constituents. In neither case were the glasses thus produced contaminated by any impurities from the ceramic utensils nor were the ceramic utensils attacked by the glass melts. The amount of striae present in the glass was surprisingly low.

While there have been shown and described what are considered to be preferred embodiments of the present invention, it will be obvious to those skilled in the art that various changes and modifications may be made therein without departing from the invention.

We claim:
1. A method for producing high quality phosphate glass comprising the steps of:
   forming ceramic utensils of tin oxide of a purity of at least 95 percent;
   placing phosphate-glass-forming batch constituents in the tin oxide ceramic utensils for melting;
   melting the batch constituents in the tin oxide ceramic utensils; and
   recovering the high quality phosphate glass.
2. A method according to claim 1, in which the purity of the tin oxide ceramic utensils is at least 99 percent.
3. A method according to claim 1, in which the additional step of stirring the melted batch constituents with a stirrer formed of tin oxide is performed.
4. A method according to claim 1, in which the step of recovering the phosphate glass is comprised of the steps of casting the melted batch constituents and annealing the resultant cast glass.
5. A method according to claim 1, in which the phosphate glass produced is phosphate optical glass.

References Cited
UNITED STATES PATENTS

| 3,149,234 | 9/1964 | Hood et al. | 250—108 |
| 3,224,860 | 12/1965 | Stinnes | 65—374 X |
| 3,519,408 | 7/1970 | Russel | 65—26 X |

ARTHUR D. KELLOGG, Primary Examiner

U.S. Cl. X.R.

23—305, 312 SP; 65—26, 374